(12) United States Patent
Bajpai et al.

(10) Patent No.: US 10,049,116 B1
(45) Date of Patent: Aug. 14, 2018

(54) PRECALCULATION OF SIGNATURES FOR USE IN CLIENT-SIDE DEDUPLICATION

(75) Inventors: Vishal Bajpai, Pune (IN); Preeti Agarwal, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 744 days.

(21) Appl. No.: 12/983,240

(22) Filed: Dec. 31, 2010

(51) Int. Cl.
*G06F 17/30* (2006.01)
*G06F 11/14* (2006.01)

(52) U.S. Cl.
CPC .... *G06F 17/3015* (2013.01); *G06F 17/30156* (2013.01); *G06F 11/1453* (2013.01); *G06F 17/30159* (2013.01); *G06F 17/30162* (2013.01)

(58) Field of Classification Search
CPC .................................. G06F 17/30147
USPC .................................. 707/646, 692
See application file for complete search history.

(56) References Cited

U.S. PATENT DOCUMENTS

| | | | |
|---|---|---|---|
| 6,374,266 B1 * | 4/2002 | Shnelvar | |
| 7,254,596 B2 * | 8/2007 | De Spiegeleer | .... G06F 11/1453 707/698 |
| 8,095,756 B1 * | 1/2012 | Somavarapu | ....... G06F 11/1453 711/162 |
| 8,412,682 B2 * | 4/2013 | Zheng | ................... G06F 3/0608 707/687 |
| 8,578,109 B2 * | 11/2013 | Vijayan et al. | ................ 711/162 |
| 2007/0220327 A1 * | 9/2007 | Ruscio | ................ G06F 11/1438 714/17 |
| 2008/0133622 A1 * | 6/2008 | Brown | ................ G06F 11/1458 |
| 2010/0293147 A1 * | 11/2010 | Snow et al. | ................... 707/640 |
| 2011/0016095 A1 * | 1/2011 | Anglin et al. | ................ 707/692 |
| 2011/0029497 A1 * | 2/2011 | Benhase et al. | .............. 707/698 |

* cited by examiner

*Primary Examiner* — Brittany N Allen
(74) *Attorney, Agent, or Firm* — Campbell Stephenson LLP

(57) ABSTRACT

Various systems and methods precalculate client-side deduplication signatures. For example, one method can identify a data object to be included in a backup and then calculate a signature of a data object prior to the start of a backup operation to create the backup. The signature identifies the data object within a deduplicated data store configured to store a backup of the data object. The signature can be calculated in response to detecting that a current usage level of system resources (e.g., such as a current processor utilization) of a client computing device is less than a threshold usage level.

21 Claims, 4 Drawing Sheets

US 10,049,116 B1

PRECALCULATION OF SIGNATURES FOR USE IN CLIENT-SIDE DEDUPLICATION

FIELD OF THE INVENTION

This invention relates to client-side data deduplication and, more particularly, to calculating signatures for use in data deduplication.

DESCRIPTION OF THE RELATED ART

Deduplication involves ensuring that each identical data item (e.g., each file or each fixed-size set of data) is only stored once within a deduplicated data storage device. This can be done by calculating a unique (or nearly unique) signature for each data item. Each time a new data item is added to the deduplicated data storage device, the signature of that data item is added to a list. Before a new data item is added, the list is checked to make sure that a copy of the data item has not already been stored in the deduplicated data storage device. In client-side deduplication systems, each data deduplication client is responsible for calculating these signatures. Unfortunately, in certain situations, calculating these signatures can negatively impact performance on the client.

SUMMARY OF THE INVENTION

Various systems and methods for precalculating client-side deduplication signatures are disclosed. For example, one method can involve identifying a data object to be included in a backup and calculating a signature of a data object prior to the start of a backup operation to create the backup. The signature identifies the data object within a deduplicated data store configured to store a backup of the data object. The signature can be calculated in response to detecting that a current usage level of system resources (e.g., such as a current processor utilization) of a client computing device is less than a threshold usage level. The method can be performed by the client computing device. In some embodiments, the data object is a block, and the backup is a volume-level backup.

In one embodiment, the act of calculating the signature is also performed in response to detecting a modification to the data object subsequent to the creation of a prior backup. This embodiment can be used when the backup is an incremental backup, and thus only data objects that have been modified since the last backup are included in the backup.

In some embodiments, the method also determines whether a copy of the data object is already present in the deduplicated data store, based upon the signature. Since the signature is calculated prior to the start of the backup operation, this determination can also be made prior to the start of the backup operation.

In one embodiment, the method can delay calculation of a second signature of a second data object until after the start of the backup operation, in response to detecting that the second data object is modified multiple times within a given time interval. This can avoid unnecessarily consuming system resources to repeatedly recalculate the second data object's signature each time the second data object is modified, since only the version of the second data object that exists at the time of the backup operation will be included in the backup.

The act of detecting the current usage level can involve polling the operating system for information and/or receiving a notification from the operation system. Alternatively, this act can be performed by accessing information identifying historical system resource usage at each of several times and then comparing that information to a current time. This historical system resource usage information can be gathered by the client computing device or provided by an administrator.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
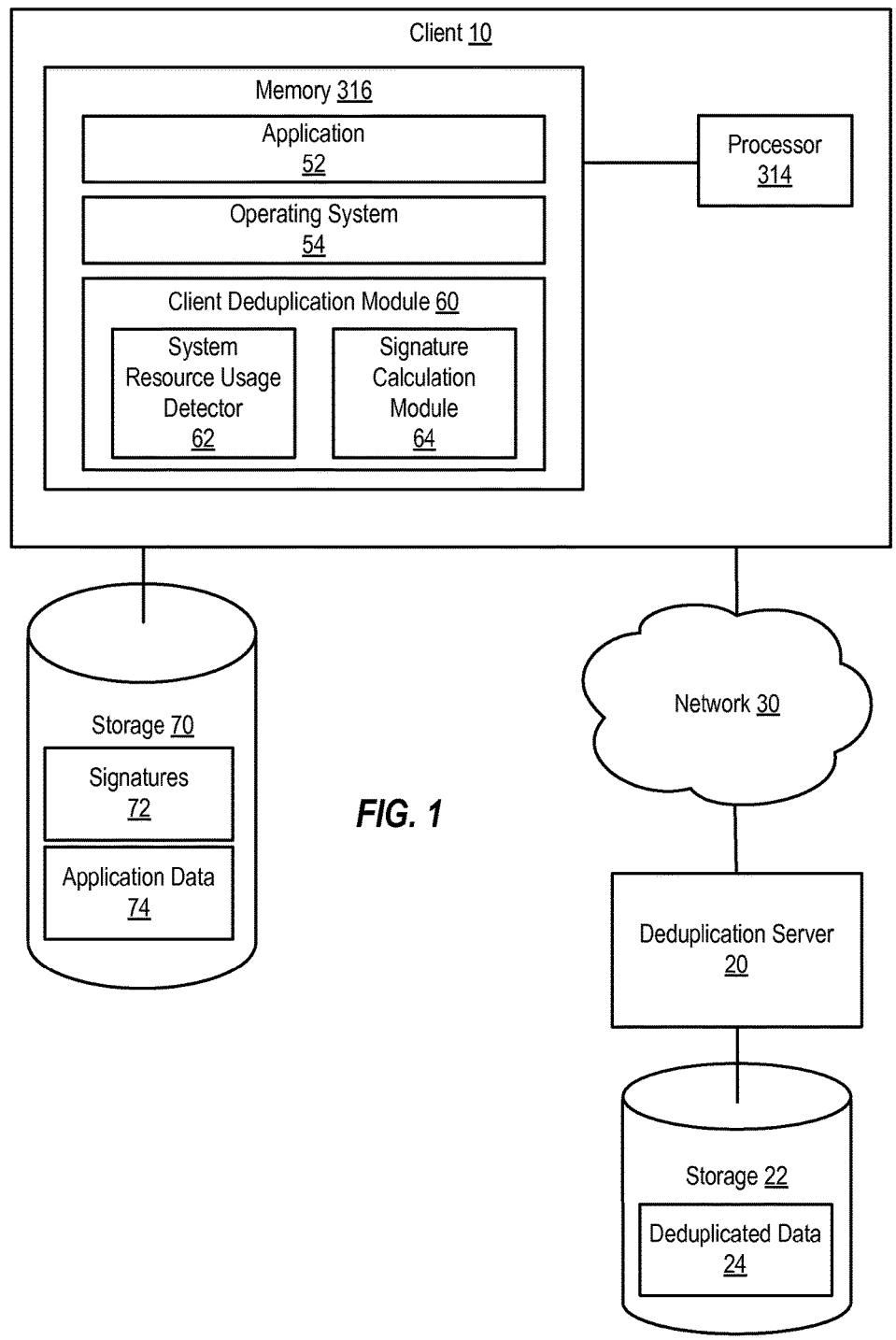
FIG. 1 is a block diagram of a system that performs client-side deduplication, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A client in a deduplication system is configured to precalculate signatures for objects (e.g., as defined by a fixed size of data, such as a block, or as defined by a logical object such as a file) that are candidates for backup storage in a data deduplication system accessed via a deduplication server. To reduce performance impacts that might otherwise arise when calculating signatures for the objects in a particular backup job, the client can monitor the system for the existence, creation, and/or modification of objects that are candidates for inclusion in an upcoming backup and precalculate the signatures of these objects (e.g., during times of relatively low system resource consumption). Thus, the client can precalculate signatures for at least some objects that are to be backed up as part of a backup job prior to the beginning of the backup window during which that backup job is scheduled to be performed.

FIG. 1 is a block diagram of a computing system. As shown, the computing system includes a client 10 and a deduplication server 20, coupled by a network 30. Network 30 can include a WAN (Wide Area Network), such as the Internet, one or more LANs (Local Area Networks), and/or one or more SANs (Storage Area Networks).

Client 10 is a computing device such as a personal computer, laptop computer, server, personal digital assistant, cell phone, or the like. Client 10 includes at least one processor 314 and a memory 316. Client 10 can include and/or be coupled (e.g., via a bus, network, or other appropriate interconnect) to a storage device 70.

Storage devices 22 (coupled to and/or included in deduplication server 20) and 70 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Memory 316 stores program instructions executable by processor 314 to implement an application 52, an operating system 54, and a client deduplication module 60. Client deduplication module 60 can be included in and/or interact with backup software (not shown) installed within memory 316 and/or otherwise configured (e.g., as an application provided as a service accessed via a network) to backup data for client 10.

Application 52 can be a word processing program, email program, graphic editing program, database application, or the like. Application 52 accesses (e.g., by generating and/or consuming) application data 74 on storage device 70.

Operating system 54 controls the hardware of client 10 and provides various services to applications executing on client 10. These services can include one or more services related to monitoring the current usage of system resources, such as memory 316 and/or processor 314. For example, operating system 54 can provide an application programming interface (API) or other interface that allows an application to access information identifying the current usage of system resources. As another example, operating system 54 can allow an application to request notifications indicating times at which the current usage of system resources has passed (either exceeded or dropped below) a certain threshold.

Client deduplication module 60 is configured to allow client 10 to access a deduplicated data storage device managed by deduplication server 20. Deduplication server 20 deduplicates data stored in storage device 22 for access by one or more clients such as client 10. Data deduplication involves reducing the number of copies of the same data that are stored as part of deduplicated data 24. For example, data deduplication can be used to achieve single-instance storage, in which only a single copy of each unique data object is maintained on a storage system. The stored deduplicated data within storage 22 is referred to herein as a deduplicated data store.

Data deduplication can be performed by generating a signature for each unit of data included in deduplicated data 24. When another copy of the same unit of data is processed for inclusion in deduplicated data 65, deduplication server 20 and/or client deduplication module 60 will detect that a copy of the unit of data is already included in deduplicated data 24 and will thus not store another copy of the item of data. Instead, deduplication server 20 will simply create a pointer to the existing copy of the unit of data and increase a reference count associated with the existing copy of the unit of data. Detection of whether a copy of the unit of data is already stored can involve calculating a signature (e.g., a checksum or hash) for the unit of data and comparing that signature to the signatures of units of data already stored within the storage system.

Client deduplication module 60 is configured to perform client-side deduplication. Client-side deduplication can also be referred to as source-side deduplication. Client-side deduplication involves the client calculating a unique (or nearly unique, as some collisions may be possible) signature for each data object considered for storage in the deduplicated data store. Calculating a signature can involve generating a checksum for the data object or applying a hashing algorithm to the data object.

The signature of a data object can be used to determine whether a copy of the data object is already present in the deduplicated data store. This determination can be made by the deduplication server 20, the client deduplication module 60, or a combination of the client deduplication module 60 and the deduplication server. For example, client deduplication module 60 can maintain a list or cache of the signatures of all of the data objects that client deduplication module 60 has caused to be added to the deduplicated data store. When a new signature is calculated, client deduplication module 60 can compare that signature to the signatures of data objects that have already been added. If the signature does not match, the client deduplication module 60 can determine that client 10 has not yet sent a copy of that data object to deduplication server 20. In response to this determination, client deduplication module 60 can send the signature to deduplication server 20, which can make a similar determination to make sure that no client (especially clients other than client 10) has already sent a copy of that data object to deduplication server 20. If deduplication server 20 determines that no copy of that data object is present within the deduplicated data store, client deduplication module 60 can send a copy of the data object (if not already provided along with its signature) to deduplication server 20 for addition to the deduplicated data store. Thus, the data object is only added to the deduplicated data store if a copy of that data object is not already present within the deduplicated data store. Furthermore, the signature does not need to be transferred to the deduplication server unless client deduplication module 60 cannot find a match for the signature locally. It is noted that in such embodiments, the client may routinely (e.g., at periodic intervals or in response to predetermined stimuli) verify the validity of its list of signatures with the deduplication server to ensure that there are no stale signatures in the list maintained on the client.

In alternative embodiments, deduplication server 20 can send each client the signatures of data objects added to the deduplicated data store by other clients, such that all clients can make the determination as to whether a data object is already present in the deduplicated data store without needing to further interact with the deduplication server. In yet other alternative embodiments, the clients can make no determination at all as to whether a data object has already been added to the deduplicated data store; instead, the clients can simply calculate signatures and pass all signatures to the deduplication server, which will then make the determination as to whether the data objects identified by the signatures have already been stored.

Client deduplication module 60 can be part of a backup system. For example, client deduplication module 60 can be included within a backup client that is configured to participate in a backup operation that generates a point-in-time copy of all or part of application data 74 (and/or all of the data stored in storage device 70) and causes that point in time copy to be stored on backup media (e.g., storage device 22).

In some embodiments, deduplication server 20 is a backup server that is configured to perform file-level (e.g., in which data is backed up on a file-by-file basis, and thus the data objects on which data is performed are files) or volume-level (e.g., in which data is backed up at the volume level, and thus the data objects are fixed-size units of data such as blocks, extents, or clusters) backups to backup application data 74 for client 10 by creating a point-in-time copy of application data 74 on storage 22. Storage 22 can be included within and/or coupled to (e.g., via a bus, network such as a SAN, or other appropriate interconnect) deduplication server 20.

The system of FIG. 1 can perform full and/or incremental backups. Full backups copy of the targeted data (e.g., all of application data 74) to the backup image. In contrast, an incremental backup is defined relative to a prior backup and only includes those data objects that have been modified subsequent to the point-in-time at which the prior backup was created.

Client deduplication module 60 can identify data objects that are candidates for inclusion in the next scheduled backup job (whether full or incremental) and precalculate the signatures for at least some of those data objects prior to the start of that backup job. Backup jobs are often prescheduled to run during a particular "backup window," which is a period of time during which the backup should be performed. Precalculated signatures for use with a particular backup job are calculated prior to the backup window for that backup job.

Client deduplication module 60 can identify data objects that are candidates for inclusion in the next backup job in a variety of different ways. For example, if the next backup image is a full backup, client deduplication module 60 can simply identify all data objects included within the storage device, volume, folder, or other container specified as the source of the backup. If the next backup image is an incremental backup, client deduplication module 60 can interact with or monitor a file system and/or volume manager in order to detect changed data objects (e.g., files or blocks or the like) as those data objects are modified by the file system and/or volume manager. For example, if a file system maintains a file change log, client deduplication module 60 can access the file change log to identify files that have been modified subsequent to a particular point in time. Alternatively, the client deduplication module 60 can query a file system filter driver for this information. Similarly, if a volume manager maintains a log or bitmap indicating changed blocks, client deduplication module 60 can access this data structure to identify blocks that have been modified subsequent to a particular point in time.

In some embodiments, client deduplication module 60 may exclude some data objects from consideration for signature precalculation. For example, client deduplication module 60 can be configured to detect when a particular data object is modified more than once in a given time period (e.g., the interval between backup jobs). If the data object is being repeatedly modified, it may be inefficient to try to precalculate its signature. Accordingly, client deduplication module 60 can generate metadata indicating that the signature of such a data object should not be precalculated. Instead, the data object's signature will be calculated during the backup window.

Once client deduplication module 60 has precalculated a signature, client deduplication module 60 can store the signature for use during the backup window. By precalculating signatures, client deduplication module 60 may reduce the detrimental effects of the backup job on client performance during the backup window, since at least some of the calculating needed to perform the backup job will be performed outside of the backup window. Additionally, client deduplication module 60 can begin sending precalculated signatures to deduplication server 20 as soon as the backup window opens, without needing to wait for those signatures to be calculated. This may reduce the length of the backup window and/or allow the client deduplication module 60 to communicate with the deduplication server more efficiently by sending batches of signatures (as opposed to individual signatures). Client deduplication module 60 can begin sending precalculated signatures to the deduplication server while other, non-precalculated signatures are still being generated during the backup window.

Additionally, in some embodiments, once some signatures have been precalculated, client deduplication module can begin determining whether the data objects represented by those signatures are already included in the deduplicated data store by comparing the precalculated signatures to a cache of signatures of data objects included in the deduplicated data store. Thus, this processing can also be moved out of the backup window.

Client deduplication module 60 can track whether a stored precalculated signature is still valid between the time the signature is calculated and the time of the backup window. If client deduplication module 60 detects (e.g., by interacting with a file system and/or volume manager as described above) that a data object for which a signature has been precalculated has subsequently been modified (prior to the upcoming backup window), client deduplication module 60 can mark that signature as being invalid or delete that signature for the list of precalculated signatures. As noted above, in such a situation, client deduplication module 60 may be configured to not recalculate a signature for the newly modified data object until the backup window.

In some embodiments, in addition to identifying data objects for which signatures can be calculated prior to the backup window, client deduplication module 60 also detects times at which the client's system resource usage is low. Client deduplication module 60 can wait until there are both signatures available to precalculate and low system resource usage to being precalculating signatures. This way, moving these calculations outside of the backup window will not negatively impact the client's performance outside of the backup window.

Client deduplication module 60 can detect the client's system resource usage in a variety of different ways. In one embodiment, an administrator can simply provide information (e.g., via a graphical user interface or command line interface, or by specifying a file or database storing the information via such an interface) that identifies periods that typically have low system resource consumption. Alternatively, client deduplication module 60 may generate that information by monitoring the client's system resource usage for a certain amount of time (e.g., several days) and then storing information identifying observed trends for future use.

In other embodiments, client deduplication module 60 can obtain information indicating the client's system resource consumption from operating system 54. For example, client deduplication module 60 can register with an operating system service to receive an alert or other notification whenever system resource usage drops below a threshold amount. Alternatively, client deduplication module 60 can query the operating system (e.g., at regular intervals and/or in response to detecting a certain number of data objects eligible for signature precalculation) for information indicating the current system resource consumption and then compare that information to a threshold (e.g., configured by an administrator).

The system resources monitored by client deduplication module 60 can include the current usage of system memory (e.g., memory 316) and/or the current usage of system processor(s) (e.g., processor 314). This usage can be specified in absolute terms (e.g., the amount of memory currently in use or the number of computations performed per unit of time by the processor) or as a percentage (e.g., indicating the current usage relative to a maximum usage).

Figure 2:
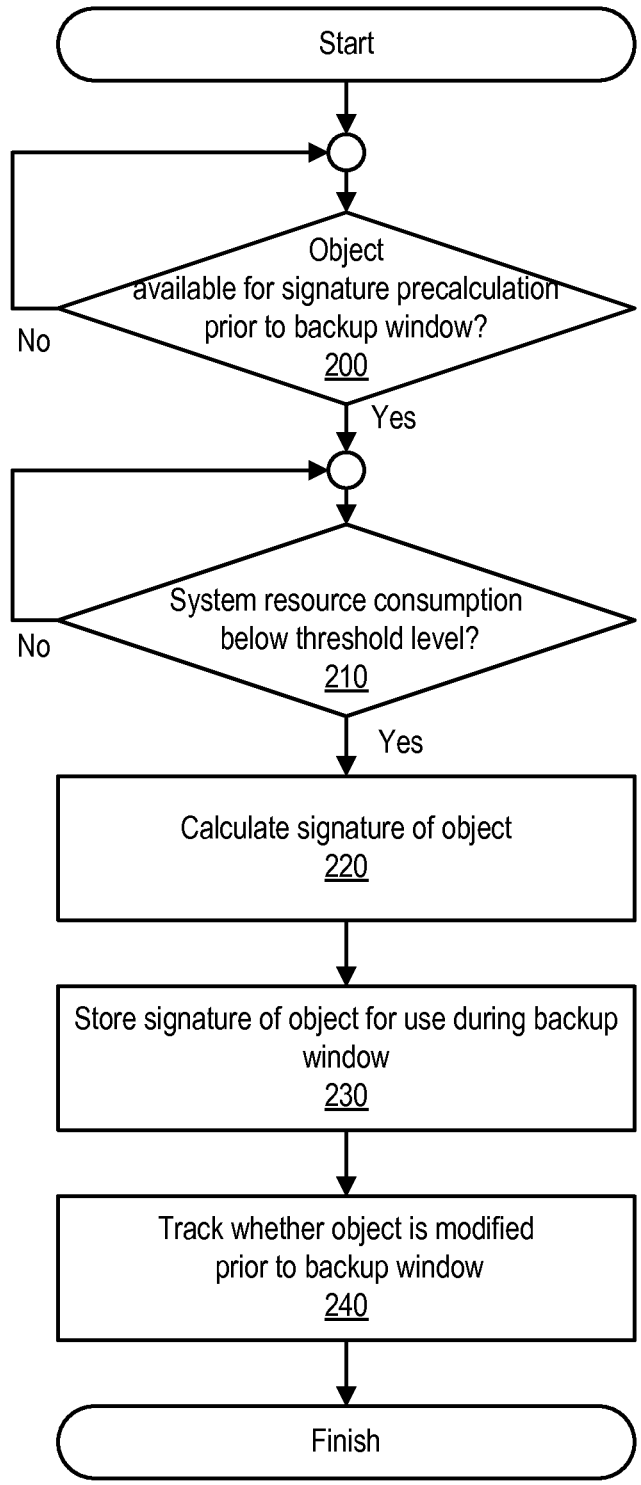
FIG. 2 is a flowchart of a method of precalculating deduplication signatures, according to one embodiment of the present invention.

FIG. 2 is a flowchart of a method a client can use to precalculate deduplication signatures. This method can be performed by a computing device that implements a client deduplication module, such as client deduplication module 60 of FIG. 1. In some embodiments, the deduplication client is part of a backup client, and this method can be performed before the scheduled backup window in which an incremental or full backup is to be created.

The method begins at 200, when the client deduplication module detects whether a data object is available for signature precalculation prior to the next backup window. This operation can be performed by identifying targeted data objects that meet certain criteria (e.g., modification subsequent to a particular prior backup, if the next backup job creates an incremental backup) and that are not excluded (e.g., due to being repeatedly modified in a particular time interval, indicating that signature precalculation would likely be inefficient). The identified data objects (e.g., files or blocks or the like) are eligible to have their signatures precalculated for use in the next backup job.

At 210, the client deduplication module can optionally detect whether system resource consumption is below a threshold level. This operation can be performed by querying an operating system and/or by receiving a notification from an operating system or by accessing data indicating times of low system resource usage and comparing that to a current time.

Operations 200 and 210 may be performed in any order. For example, if performed in the order shown, operation 210 can be performed in response to one (or another positive integer number) of eligible data objects being identified at 200. Alternatively, operation 210 may be performed prior to operation 200. For example, a client deduplication module may wait for a period of low system resource consumption to begin identifying data objects that are eligible for signature precalculation.

At 220, if an eligible data object has been detected and (if required) system resources have been detected to be below a threshold, the data object's signature is calculated. This operation is performed prior to the opening of the backup window in which the precalculated signature will be used. As noted above, a signature can be generated by calculating a checksum or hash of the data object. Such a signature identifies the data object within a deduplicated data store.

At 230, the precalculated signature is stored for subsequent use during the backup window. Operation 240 then tracks whether the data object identified by the precalculated signature is modified prior to the opening of the backup window. If so, the client deduplication module can mark the signature as invalid or recalculated the signature.

Figure 3:
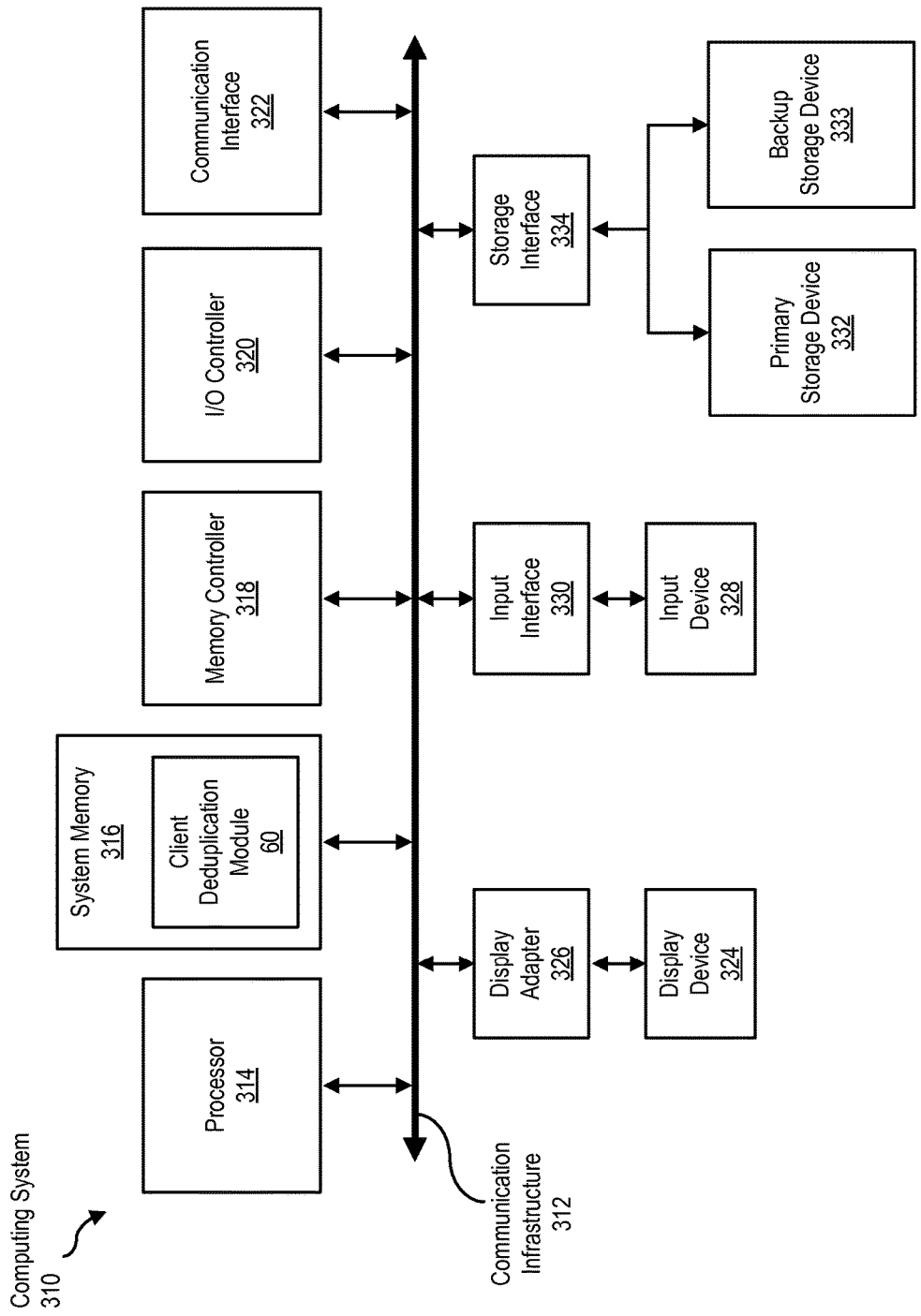
FIG. 3 is a block diagram of a computing device, illustrating how a client deduplication module can be implemented in software, according to one embodiment of the present invention.

FIG. 3 is a block diagram of a computing system 310 capable of implementing client-side deduplication as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a client deduplication module 60, computing system 310 becomes a special purpose computing device that is configured to perform client-side deduplication in a manner that calculates at least some deduplication signatures (e.g., when the client's system resource usage is otherwise low).

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, primary storage device 332, as described in detail below). In one example, program instructions executable to implement a client deduplication module 60 (e.g., as shown in FIG. 1) may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may be a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can store information such as deduplication signatures, application data, backup images, and/or a backup catalog.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
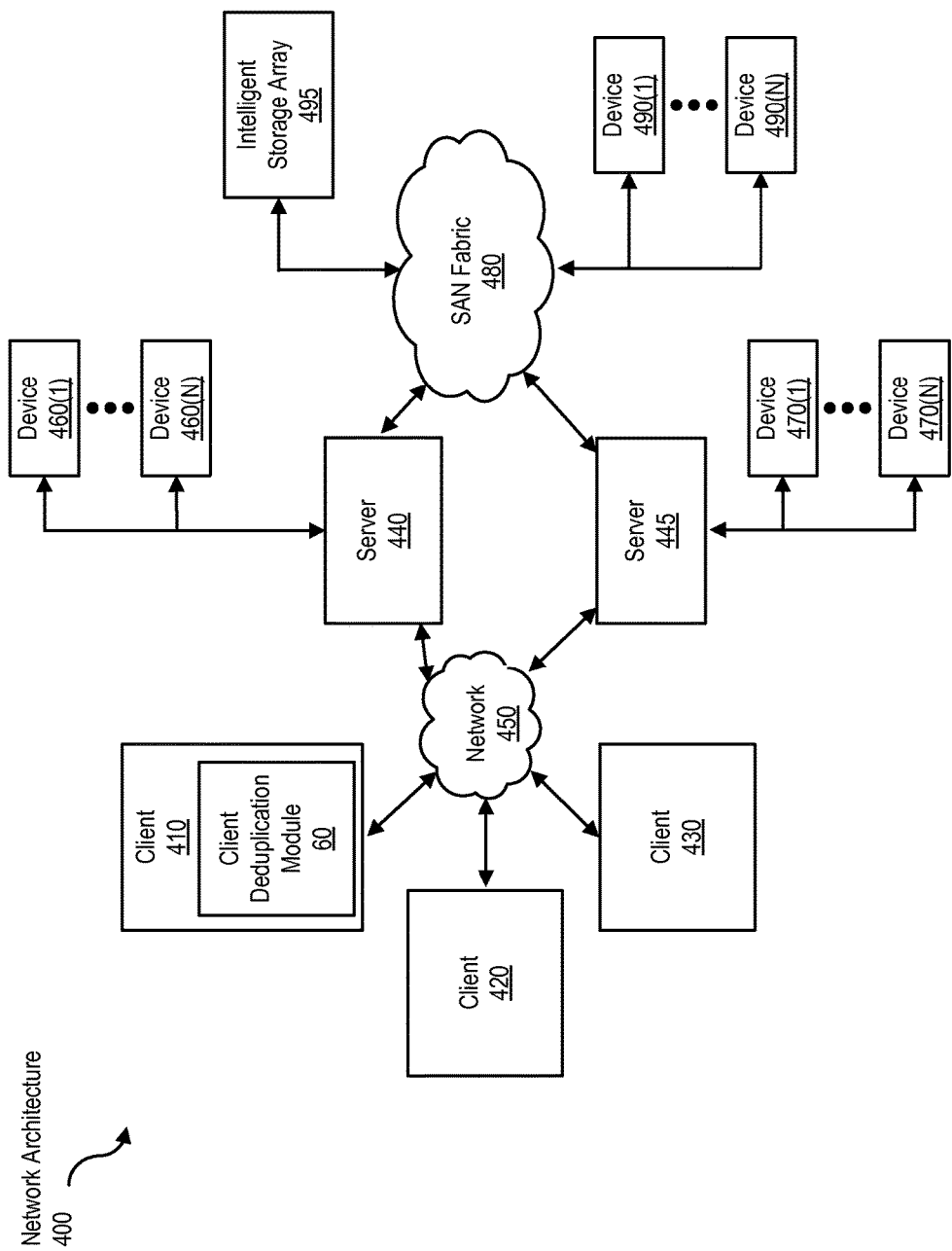
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 3.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 may include a client deduplication module 60 as shown in FIG. 1.

As illustrated in FIG. 4, one or more storage devices 440(1)-(N) may be directly attached to server 440. Similarly, one or more storage devices 470(1)-(N) may be directly attached to server 445. Storage devices 440(1)-(N) and storage devices 470(1)-(N) generally represent any type or form of storage device or medium capable of storing data and/or other computer-readable instructions. In certain embodiments, storage devices 440(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS). Such storage devices can store deduplication signatures, backup images and/or backup catalogs, as described above.

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 440(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 4, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 440(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 440(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a client deduplication module may transform the behavior of a deduplication system such that the client's performance is less negatively impacted due to the calculation of deduplication signatures on the client.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   identifying a data object that meets one or more predetermined criteria for storage in a deduplicated data store;
   detecting that a current usage level of system resources of a client computing device is less than a threshold usage level, wherein
      the detecting the current usage level of system resources is performed after a beginning time of a backup window has been scheduled, but prior to the beginning time of the backup window;
   in response to the and the detecting, calculating a signature of the data object being considered for storage in the deduplicated data store, wherein the calculating the signature of the data object is performed after the beginning time of the backup window has been scheduled, but prior to the beginning time of the backup window, a backup job has been prescheduled to be performed during the backup window, and the calculating is performed in response to determining that the data object was not modified more than once during a given time period;

subsequent to the calculating, determining whether to include the data object in a backup, wherein the determining comprises comparing the signature for the data object to a list of signatures for deduplicated data objects that have been previously stored in the backup; and performing the backup job, wherein the backup job is performed during the backup window, the backup job is based, at least in part, on a result of the determining, and the detecting, the identifying, the calculating, the determining, and the performing the backup job are performed by a client computing device.

2. The method of claim 1, wherein the current usage level of the system resources indicates a current processor utilization.

3. The method of claim 1, wherein the detecting comprises accessing information identifying historical system resource usage at each of a plurality of times and comparing that information to a current time.

4. The method of claim 1, wherein the calculating is also performed in response to detecting a modification to the data object subsequent to creating a prior backup, wherein the prior backup is an incremental backup.

5. The method of claim 1, wherein the data object is a block, and wherein the backup is a volume-level backup.

6. The method of claim 1, further comprising determining whether a copy of the data object is already present in the deduplicated data store, based upon the signature, wherein the determining whether the copy of the data object is already present is performed prior to starting the backup job.

7. The method of claim 1, further comprising delaying calculation of a second signature of a second data object until after starting the backup job, in response to detecting that the second data object is modified a plurality of times within a time interval.

8. A non-transitory computer readable storage medium storing program instructions executable to:

identify a data object that meets one or more predetermined criteria for storage in a deduplicated data store;

make a detection that a current usage level of system resources of a client computing device is less than a threshold usage level, wherein the detection of the current usage level of system resources is made, after a beginning time of a backup window has been scheduled, but prior to the beginning time of the backup window, indicating that the current usage level is less than the threshold;

in response to identifying the data object and making the detection, calculate a signature of the data object being considered for storage in the deduplicated data store, wherein calculating the signature of the data object is performed after the beginning time of the backup window has been scheduled, but prior to the beginning time of a backup window, a backup job has been prescheduled to be performed during the backup window, and the calculating is performed in response to determining that the data object was not modified more than once during a given time period;

subsequent to calculating the signature, determine whether to include the data object in a backup, wherein determining whether to include the data object in the backup comprises comparing the signature for the data object to a list of signatures for deduplicated data objects that have been previously stored in the backup; and perform the backup job, wherein the backup job is performed during the backup window, the backup job is based, at least in part, on a result of the determining.

9. The non-transitory computer readable storage medium of claim 8, wherein the current usage level of the system resources indicates a current processor utilization.

10. The non-transitory computer readable storage medium of claim 8, wherein detecting the current usage level comprises accessing information identifying historical system resource usage at each of a plurality of times and comparing that information to a current time.

11. The non-transitory computer readable storage medium of claim 8, wherein the signature is calculated in response to detecting a modification to the data object subsequent to creating a prior backup, wherein the prior backup is an incremental backup.

12. The non-transitory computer readable storage medium of claim 8, wherein the data object is a block, and wherein the backup is a volume-level backup.

13. The non-transitory computer readable storage medium of claim 8, wherein the program instructions are further executable to determine whether a copy of the data object is already present in the deduplicated data store, based upon the signature, wherein determining whether the copy of the data object is already present is performed prior to starting the backup job.

14. The non-transitory computer readable storage medium of claim 8, wherein the program instructions are further executable to delay calculation of a second signature of a second data object until after starting the backup job, in response to detecting that the second data object is modified a plurality of times within a time interval.

15. A system comprising:

one or more processors; and a memory coupled to the one or more processors, wherein the memory stores program instructions executable by the one or more processors to:

identify a data object that meets one or more predetermined criteria for storage in a deduplicated data store;

make a detection that a current usage level of system resources of a client computing device is less than a threshold usage level, wherein the detection of the current usage level of system resources is made after a beginning time of a backup window has been scheduled, but prior to the beginning time of the backup window;

in response to identifying the data object and making the detection, calculate a signature of the data object being considered for storage in the deduplicated data store, wherein calculating the signature of the data object is performed after the beginning time of the backup window has been scheduled, but prior to the beginning time of the backup window, a backup job has been prescheduled to be performed during the backup window, and the calculating is performed in response to determining that the data object was not modified more than once during a given time period;

subsequent to calculating the signature, determine whether to include the data object in a backup, wherein determining whether to include the data object in the backup comprises comparing the signature for the data object to a list of signatures for deduplicated data objects that have been previously stored in the backup; and perform the backup job, wherein
the backup job is performed during the backup window,
the backup job is based, at least in part, on a result of the determining.

16. The system of claim 15, wherein the current usage level of the system resources indicates a current processor utilization.

17. The system of claim 15, wherein detecting the current usage level comprises accessing information identifying historical system resource usage at each of a plurality of times and comparing that information to a current time.

18. The system of claim 15, wherein the signature is calculated in response to detecting a modification to the data object subsequent creating a prior backup, wherein the prior backup is an incremental backup.

19. The system of claim 15, wherein the data object is a block, and wherein the backup is a volume-level backup.

20. The system of claim 15, wherein the program instructions are further executable to determine whether a copy of the data object is already present in the deduplicated data store, based upon the signature, wherein determining whether the copy of the data object is already present is performed prior to starting the backup job.

21. The system of claim 15, wherein the program instructions are further executable to delay calculation of a second signature of a second data object until after starting the backup job, in response to detecting that the second data object is modified a plurality of times within a time interval.

\* \* \* \* \*